(12) United States Patent
Forenza et al.

(10) Patent No.: US 7,778,147 B2
(45) Date of Patent: Aug. 17, 2010

(54) MIMO COMMUNICATION SYSTEM USING AN ADAPTIVE TRANSMISSION MODE SWITCHING TECHNIQUE

(75) Inventors: Antonio Forenza, Austin, TX (US); Robert W. Heath, Austin, TX (US); Hyoung-Woon Park, Seongnam-si (KR); Ho Yang, Yongin-si (KR); Ho-Jin Kim, Seoul (KR); Marios Kountouris, Nice (FR); Pandharipande Ashish, Suwon-si (KR)

(73) Assignees: Samsung Electronics Co., Ltd., Suwon-si (KR); Board of Regents, The University of Texas System, Austin, TX (US)

( * ) Notice: Subject to any disclaimer, the term of this patent is extended or adjusted under 35 U.S.C. 154(b) by 864 days.

(21) Appl. No.: 11/221,223

(22) Filed: Sep. 7, 2005

(65) Prior Publication Data

US 2006/0083195 A1 Apr. 20, 2006

Related U.S. Application Data

(60) Provisional application No. 60/607,738, filed on Sep. 7, 2004.

(30) Foreign Application Priority Data

Dec. 29, 2004 (KR) .................. 10-2004-0115347

(51) Int. Cl.
*H04J 9/00* (2006.01)
(52) U.S. Cl. ....................... 370/204; 370/478
(58) Field of Classification Search ............. 370/328, 370/204, 310, 341; 714/746, 712
See application file for complete search history.

(56) References Cited

U.S. PATENT DOCUMENTS 6,760,882 B1 * 7/2004 Gesbert et al. ............. 714/774
2002/0122383 A1 * 9/2002 Wu et al. .................... 370/210

(Continued)

FOREIGN PATENT DOCUMENTS

EP 1 355 434 A1 10/2003

(Continued)

OTHER PUBLICATIONS

Cheolhang Cheon, Monte Carlo Simulation of Delay and Angle Spread in Different Building Environments; IEEE VTC 2000.*

*Primary Examiner*—Kevin C Harper
*Assistant Examiner*—Henry Baron
(74) *Attorney, Agent, or Firm*—NSIP Law

(57) ABSTRACT

A multiple-input multiple-output (MIMO) wireless communication system. A transmitter that includes a plurality of transmit antennas selects one of a spatial multiplexing scheme and a spatial diversity scheme, processes a signal in the selected transmission scheme, and transmits the signal through the plurality of transmit antennas. A receiver that includes a plurality of receive antennas processes a signal in a reception scheme mapped to a transmission scheme of the transmitter. The transmission schemes include a transmission scheme for maximizing diversity gain and a transmission scheme for maximizing spectral efficiency. The MIMO communication system using an adaptive transmission mode switching technique performs switching between MIMO transmission modes using spatial selectivity of a channel, thereby obtaining maximum gain in a signal to noise ratio (SNR) and spectral efficiency according to channel state.

23 Claims, 5 Drawing Sheets

U.S. PATENT DOCUMENTS

2002/0147953 A1* 10/2002 Catreux et al. ............... 714/746
2005/0013352 A1* 1/2005 Hottinen ..................... 375/219
2006/0018410 A1* 1/2006 Onggosanusi et al. ....... 375/340
2006/0146925 A1* 7/2006 Birru .......................... 375/233
2007/0140370 A1* 6/2007 Helard et al. ............... 375/267

FOREIGN PATENT DOCUMENTS

| EP | 1 521 386 A2 | 4/2005 |
| WO | WO 02/25853 A2 | 3/2002 |
| WO | WO 03/085876 A1 | 10/2003 |

* cited by examiner

MIMO COMMUNICATION SYSTEM USING AN ADAPTIVE TRANSMISSION MODE SWITCHING TECHNIQUE

PRIORITY

This application claims priority under 35 U.S.C. §119 to a provisional application entitled "MIMO Communication System Using Adaptive Transmission Mode Switching Technique" filed in the United States Patent and Trademark Office on Sep. 7, 2004 and assigned Ser. No. 60/607,738, and to an application entitled "MIMO Communication System Using Adaptive Transmission Mode Switching Technique" filed in the Korean Intellectual Property Office on Dec. 29, 2004 and assigned Serial No. 2004-115347, the contents of both of which are incorporated herein by reference.

BACKGROUND OF THE INVENTION

1. Field of the Invention

The present invention relates generally to multiple-input multiple-output (MIMO) communication systems, and more particularly to a MIMO communication system for selecting an optimal MIMO transmission and reception scheme and communicating using the selected scheme.

2. Discussion of the Related Art

Recent wireless communication technology improvements have been directed to various multimedia communications. Accordingly, a large amount of research is being conducted on high-speed data transmission technologies. The current third generation (3G) wireless communication systems are based on a code division multiple access (CDMA) transmission scheme. However, because the CDMA transmission scheme has limitations in processing large-capacity wireless data, a multicarrier based orthogonal frequency division multiplexing (OFDM) transmission scheme is being considered for next generation wireless communication systems.

A basic concept of the OFDM transmission scheme is to increase a data rate by converting a serial input data stream into N parallel data streams and transmitting the N parallel data streams through separated subcarriers.

Because the OFDM subcarriers are orthogonal, the spectra of subcarriers can overlap each other. A receiver can easily separate subcarriers using a simple signal processing technique. In this case, as compared with when data is sequentially transmitted using a single carrier, a transmission symbol interval is lengthened and the influence of a channel delay time or impulse noise is reduced. The OFDM transmission scheme can reduce interference between successive symbols, thereby offering the robustness to a multipath channel. Further, the OFDM transmission scheme can reduce the complexity of channel equalization, and can improve the spectral efficiency, as compared with a conventional frequency division scheme.

However, an increase in the transmission bandwidth alone is not sufficient to satisfy a target transmission rate for the next generation wireless communication systems. To increase a transmission rate for a given bandwidth, many methods have been presented. Currently, it is known that a method using multiple antennas is most effective. Although, multiple-input multiple-output (MIMO) multiplexing scheme for increasing a transmission rate using multiple antennas is difficult to be applied for wideband transmission. However, when OFDM characteristics are used, the MIMO multiplexing scheme can be applied for the wideband transmission. Accordingly, a large amount of research is being conducted on a method for combining MIMO multiplexing and OFDM, and new methods are being proposed.

In the wireless communication system, an increase in overall system throughput as well as an instantaneous transmission rate is important. A method that is most suitable to increase the overall system throughput is adaptive modulation and coding (AMC). AMC adapts to variations in a transmission environment. Also, in the next generation wireless communication systems, AMC is used as basis technology to improve the overall system throughput. AMC is suitable for an OFDM system because the OFDM system transmits different signals on a subcarrier-by-subcarrier basis and can be applied to subcarriers.

An increase in the transmission bandwidth alone is not sufficient to satisfy a target transmission rate for fourth generation (4G) wireless communication systems. To increase a transmission rate for a given bandwidth, many methods are present. As indicated above, it is known that a method using multiple antennas is most effective. Further, when OFDM characteristics are used, the MIMO scheme can be applied for the wideband transmission. Accordingly, a large amount of research is being conducted on a method for combining MIMO and OFDM, and new methods are being proposed.

The MIMO scheme can improve reception reliability for a given data rate or increase a data rate for given reliability. That is, diversity gain can be obtained by transmitting the same data through multiple paths in an environment in which a channel state is bad, and multiplexing gain can be obtained by transmitting individual data streams through different spatial channels in a parallel fashion in an environment in which a channel state is good.

Current research associated with MIMO is mostly focused on a transmission scheme for obtaining the maximum diversity gain or the maximum spatial multiplexing gain. Further, a technique for switching diversity mode and multiplexing mode according to channel variation has been proposed.

A link adaptation algorithm serving as one transmission mode switching technique is designed to maximize the spectral efficiency by switching between transmission diversity (TM) mode and spatial multiplexing (SM) mode based on signal to noise ratios (SNRs) and time/space indicators. However, the spatial selectivity of a channel is not considered in the link adaptation algorithm.

A multiplexing and diversity mode switching technique serving as another transmission mode switching technique based on the distance between signal points in the constellation has been proposed. In the constellation based transmission mode switching technique, a mode selection criterion uses the condition number of instantaneous channel realization as spatial information. However, this transmission mode switching technique may obtain significant diversity gain, but is based on a fixed transmission rate.

SUMMARY OF THE INVENTION

It is, therefore, an aspect of the present invention to provide a multiple-input multiple-output (MIMO) communication system and method that increase the spectral efficiency for a predefined target error rate by performing adaptive transmission mode switching using a novel switching criterion.

The above and other aspects of the present invention can be achieved by a multiple-input multiple-output (MIMO) wireless communication system. The system includes: a transmitter having a plurality of transmit antennas for selecting one of at least two transmission schemes including a spatial multiplexing scheme and a spatial diversity scheme, processing a signal in the selected transmission scheme, and transmitting the signal through the plurality of transmit antennas; and at least one receiver having a plurality of receive antennas for processing a signal through the plurality of receive antennas in a reception scheme mapped to a transmission scheme of the transmitter.

BRIEF DESCRIPTION OF THE DRAWINGS

The above and other aspects, features, and advantages of the present invention will be more clearly understood from the following detailed description taken in conjunction with the accompanying drawings, in which.

DETAILED DESCRIPTION OF THE PREFERRED EMBODIMENTS

Figure 1:
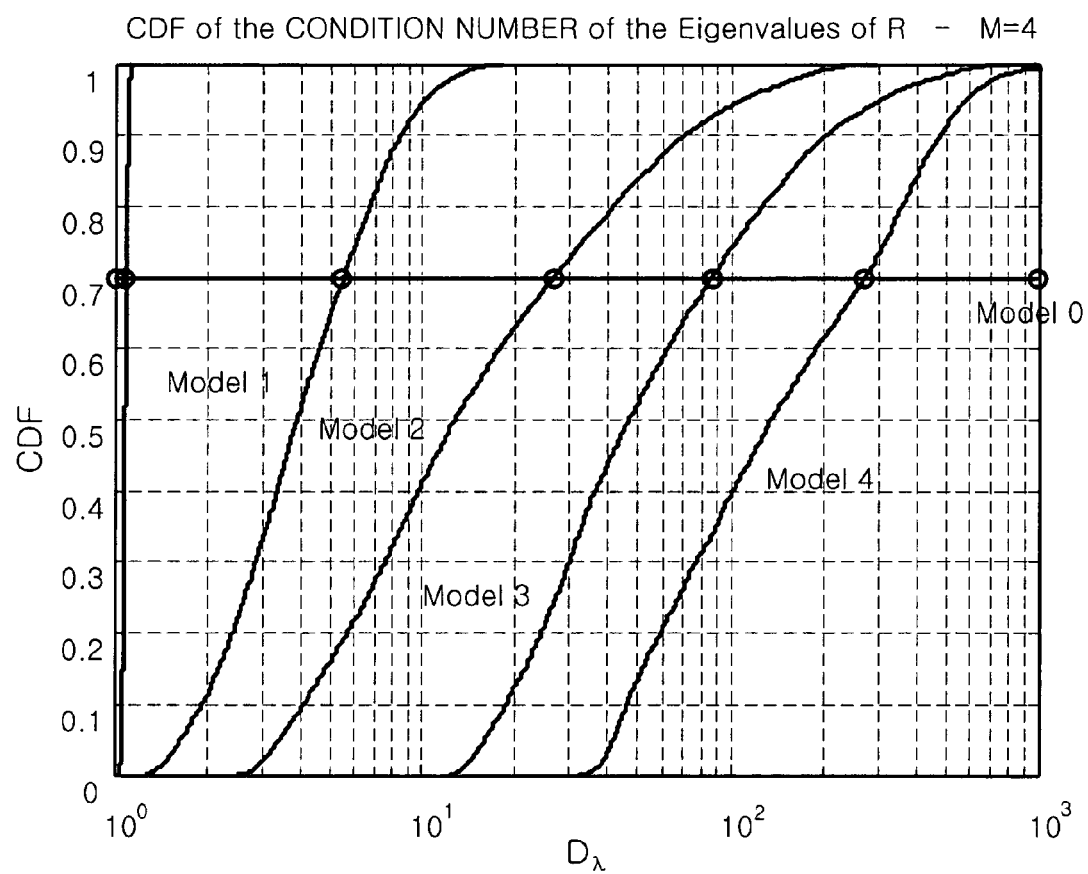
FIG. 1 is a graph illustrating cumulative density function (CDF) curves of a relative condition number for four channel models considered in the present invention.

Preferred embodiments in accordance with the present invention will be described in detail herein below with reference to the accompanying drawings. In the following description of the present invention, a detailed description of known functions and configuration incorporated herein will be omitted when it may obscure the subject matter of the present invention.

In accordance with the present invention, the adaptive transmission mode switching method introduces a new switching criterion to increase the spectral efficiency for a predefined target error rate. The adaptive transmission mode switching method characterizes channel spatial selectivity based on a metric derived from spatial correlation matrices.

In accordance with the present invention, the adaptive transmission mode switching method estimates channel quality and adaptively selects a MIMO transmission scheme that maximizes the throughput for a given error rate and transmit power on the basis of the estimated channel quality. This adaptive transmission mode switching algorithm can be practically implemented by the definition of a set of link quality regions, which represent typical channel scenarios. These link quality regions are mapped to a set of transmission modes defined by a combination of modulation/coding and MIMO schemes through a look-up table (LUT). Accordingly, the adaptive transmission mode switching algorithm estimates the link quality regions and selects the optimal mode for the current transmission from the LUT.

For convenience, the adaptive transmission mode switching method considers two extreme channel scenarios in a cellular system environment. The first channel scenario is defined by line-of-sight (LOS) and a cell edge region. In this case, a user terminal requires a diversity function because the channel has a low rank or a low signal to noise ratio (SNR). Therefore, diversity schemes, i.e., beamforming, are selected by the adaptive transmission mode switching algorithm of the present invention in order to increase the robustness of the link.

In the second channel scenario, rich scattering or a region adjacent to a base station characterizes the channel. In this case, because the channel has a high rank or high SNR, the adaptive transmission mode switching algorithm switches the transmission mode to a multiplexing scheme in order to increase the spectral efficiency.

In accordance with the present invention, the adaptive transmission mode switching method defines four different channel models according to spatial selectivity that is a function of angle spread (AS), number of clusters ($N_c$), and Ricean K-factor (or LOS). The spatial selectivity depends on an antenna array. Herein, a uniform linear array (ULA) with four antenna elements half-wavelength spaced apart is described. The four channel models are defined as shown in Table 1.

TABLE 1

|  | Model 1 | Model 2 | Model 3 | Model 4 |
|---|---|---|---|---|
| LOS | N-LOS | N-LOS | Q-LOS | F-LOS |
| AS | [28°, 55°] | [24.6°, 22.4°] | [24.6°, 22.4°] | 30° |
| K-factor | −inf dB | −inf dB | 2 dB | 6 dB |
| $N_c$ | 6 | 2 | 2 | 1 |

The combination of these models and SNR threshold values defines link quality regions.

To define the link quality region, the present invention utilizes two link quality metrics, i.e., an average SNR and a relative condition number $D_\lambda$. The relative condition number $D_\lambda$ is expressed as shown in Equation (1).

$$D_\lambda = \frac{\lambda_{max}}{\lambda_{min}} \qquad (1)$$

In Equation (1), $\lambda_{max}$ and $\lambda_{min}$ denote the maximum and minimum eigenvalues of the spatial correlation matrix of the MIMO channel, and $1 \leq D_\lambda \leq +\infty$. The performance of MIMO systems depends on characteristics of a propagation environment. More specifically, capacity and error rate performance depend on the eigenvalues of transmit/receive spatial correlation matrices.

The present invention exploits the distribution of the relative condition number of the eigenvalues in order to estimate the spatial selectivity of the MIMO channel.

FIG. 1 is a graph illustrating cumulative density function (CDF) curves of a relative condition number for four channel models considered in the present invention. Because the CDF curves in FIG. 1 are well separated between different channel models, the condition number can be used as an indicator of the spatial selectivity of the channel. More specifically, by choosing 70% of the CDF as a threshold, four separable regions can be defined as follows.

Region #1 (N-LOS, High AS): $D_\lambda \in [1,5)$
Region #2 (N-LOS, Low AS): $D_\lambda \in [5,30)$
Region #3 (Q-LOS): $D_\lambda \in [30,90)$
Region #4 (F-LOS): $D_\lambda \in [90,+\infty)$ Each region defines a typical channel scenario characterized by a certain degree of spatial selectivity. The combination of these regions and different quantized values of a target SNR defines the link quality regions introduced in the present invention.

The condition number is obtained from the eigenvalues of the long-term transmit/receive spatial correlation matrices $R_{TX}$ and $R_{RX}$. These matrices are estimated using Equations (2) and (3).

$$\hat{R}_{TX} = E_t\{H^H(t) \cdot H(t)\} \quad (2)$$

$$\hat{R}_{RX} = E_t\{H(t) \cdot H^H(t)\} \quad (3)$$

In Equations (2) and (3), H(t) denotes the MIMO channel matrix at time t. Reliable estimates of the spatial correlation matrices can be obtained by averaging the MIMO channel matrices over 50 updates as in Equations (2) and (3).

For implementation of the adaptive transmission mode switching method of the present invention, the condition number is computed for both transmit and receive spatial correlation matrices. Thereafter, the adaptive transmission mode switching method selects the highest condition number between the transmitter and receiver and determines the current link quality region based on the selected highest condition number.

The present invention defines eight modulation and coding schemes (MCSs) according to the Institute of Electrical & Electronic Engineers (IEEE) 802.11a standard. The combination of the eight MCSs with three MIMO schemes results in a total of twenty four different transmission modes. A preferred embodiment of the present invention selects twelve modes including Mode 0 serving as non-transmission mode from the twenty four transmission modes and uses the selected modes. The selected twelve transmission modes are mapped to channel state information based on the average SNR and the relative condition number $D_\lambda$, and the mapping result is stored in the LUT.

Figure 2:
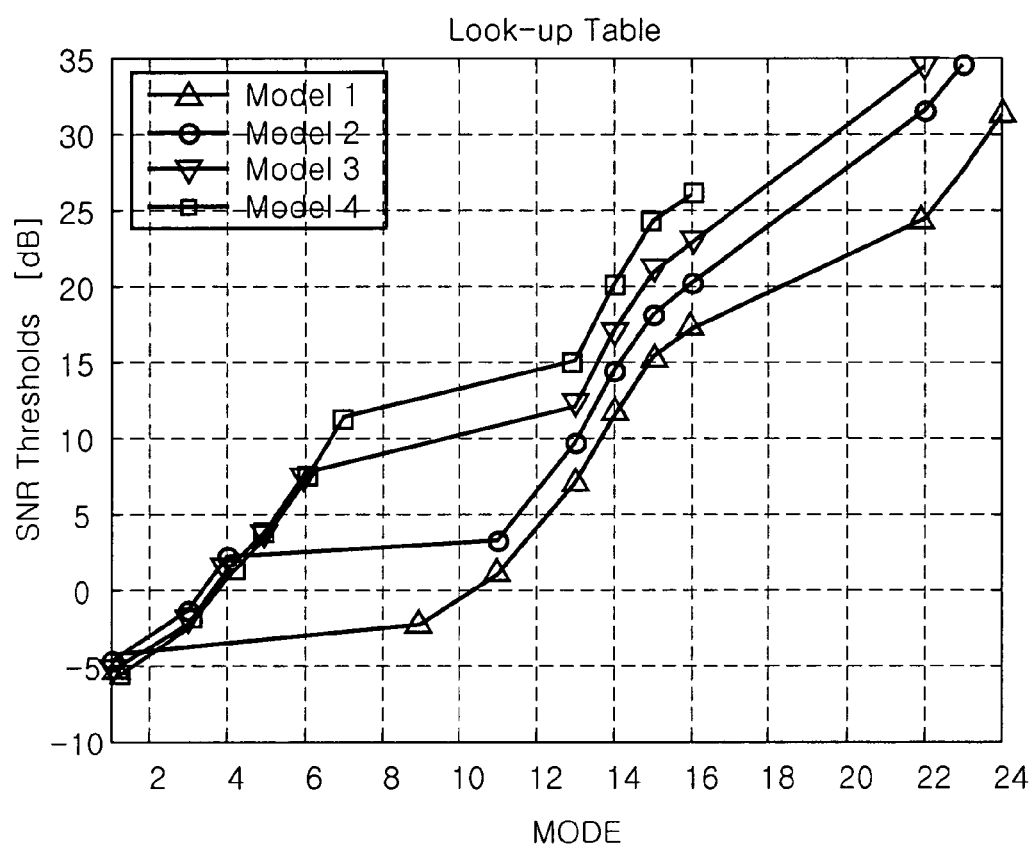
FIG. 2 is a graph illustrating a look-up table (LUT) applied to an adaptive transmission mode switching technique in accordance with a preferred embodiment of the present invention.

FIG. 2 is a graph illustrating the LUT applied to the adaptive transmission mode switching technique in accordance with a preferred embodiment of the present invention. When a channel model is given, an SNR value in each point is mapped to MIMO transmission mode. Mapping between link quality regions (defined by the combination of SNR threshold values and channel models) and transmission modes is obtained from a bit error rate (BER) curve in order to satisfy a predefined target error rate.

In accordance with the present invention, the adaptive transmission mode switching method estimates the link quality for the current transmission on the basis of the average SNR and the relative condition number. These parameters are used as inputs of the LUT for selecting the transmission mode that provides the highest throughput for a predefined target error rate.

Figure 3:
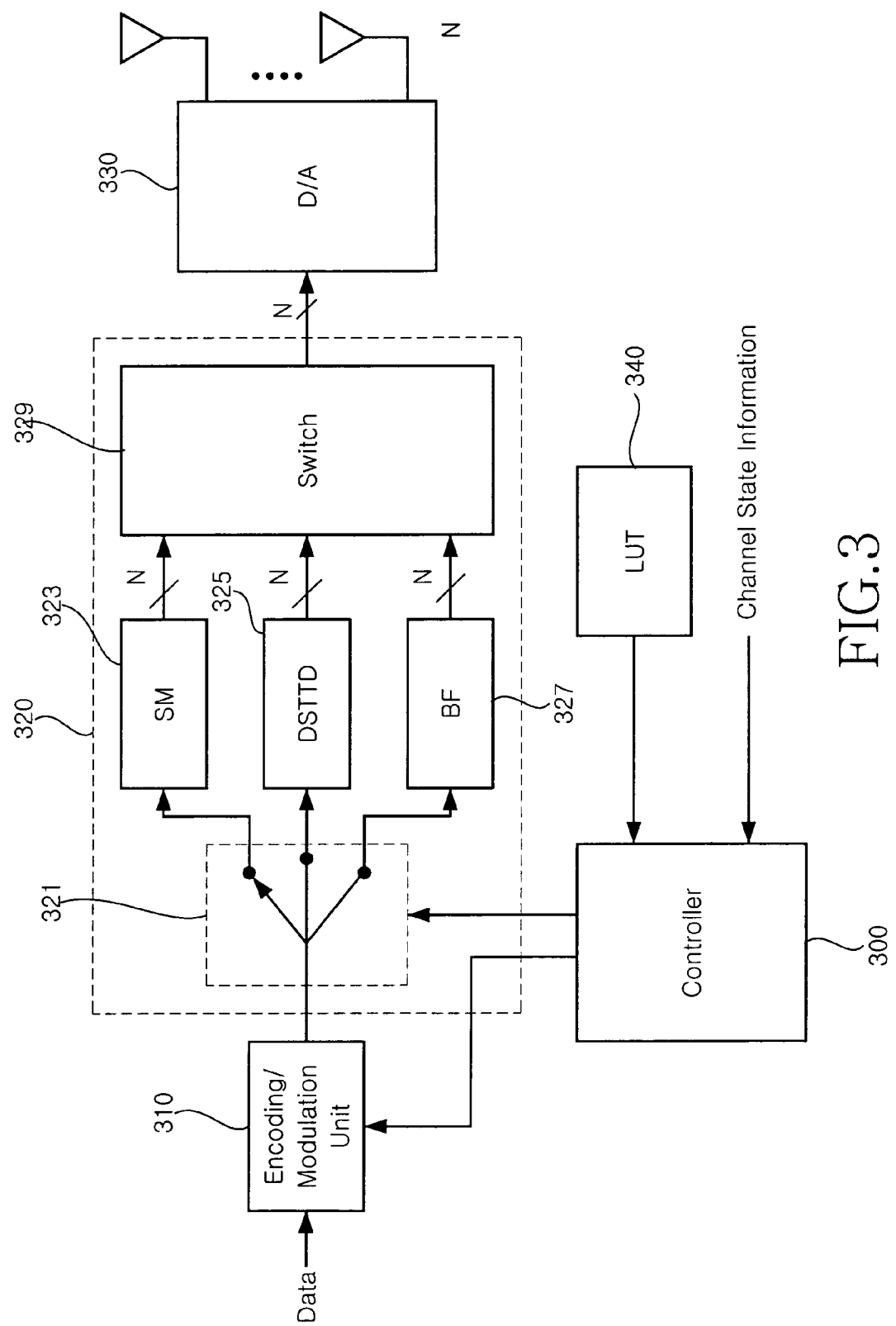
FIG. 3 is a block diagram illustrating a structure of a transmitter in a multiple-input multiple-output (MIMO) system using an adaptive transmission mode switching technique in accordance with a preferred embodiment of the present invention.

FIG. 3 is a block diagram illustrating a transmitter in a MIMO system using an adaptive transmission mode switching technique in accordance with a preferred embodiment of the present invention. In FIG. 3, the MIMO transmitter includes an encoding/modulation unit 310 for encoding and modulating input data in response to a control signal of a controller 300, a mode switching unit 320 for selecting transmission mode for symbols output from the encoding/modulation unit 310 in response to a control signal of the controller 300 and outputting the symbols in the selected transmission mode, and a digital to analog (D/A) conversion unit 330 for converting the transmission symbols output from the mode switching unit 320 according to D/A conversion and transmitting the converted symbols through N transmit antennas.

The mode switching unit 320 includes three modules operating in different MIMO algorithms, i.e., a spatial multiplexing (SM) module 323, a double space time transmit diversity (DSTTD) module 325, and a beamforming (BF) module 327. Further, the mode switching unit 320 includes a first switch 321 for coupling an output signal of the encoding/modulation unit 310 to an input terminal of the SM module 323, the DSTTD module 325, and the BF module 327, and a second switch 329 for selectively outputting an output signal of the SM module 323, the DSTTD module 325, and the BF module 327 to the D/A conversion unit 330.

The controller 300 receives channel state information fed back from the receiver, selects transmission mode mapped to the channel state information from an LUT 340, and outputs control signals to the encoding/modulation unit 310 and the mode switching unit 320.

In this embodiment of the present invention, three transmission schemes of SM, DSTTD, and BF can be selected and used as MIMO algorithms. However, it should be noted that the types of MIMO algorithms are not limited to BF, DSTTD, and BF, and the number of MIMO algorithms is not limited to only three.

Figure 4:
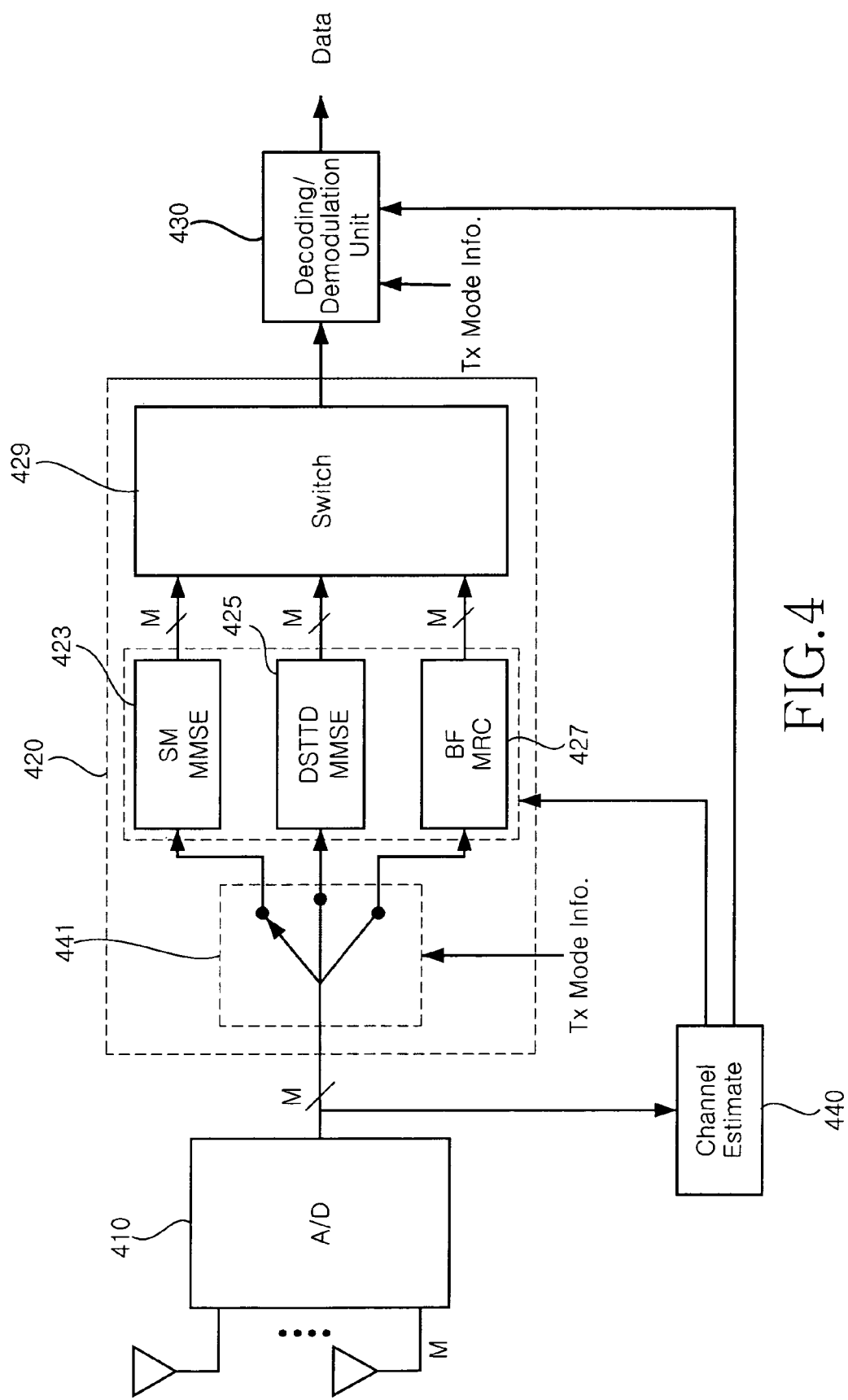
FIG. 4 is a block diagram illustrating a receiver in a MIMO system using an adaptive transmission mode switching technique in accordance with a preferred embodiment of the present invention.

FIG. 4 is a block diagram illustrating a receiver in a MIMO system using an adaptive transmission mode switching technique in accordance with a preferred embodiment of the present invention. In FIG. 4, the MIMO receiver includes an analog to digital (A/D) conversion unit 410 for converting a signal received from the transmitter through a radio channel according to A/D conversion, a mode switching unit 420 for outputting an output signal of the A/D conversion unit 410 in reception mode mapped to the transmission mode selected by the transmitter, and a decoding/demodulation unit 430 for decoding and demodulating an output signal of the mode switching unit 420.

The mode switching unit 420 includes an SM-minimum mean squared error (MMSE) module 423, a DSTTD-MMSE module 425, and a BF-maximum ratio combining (MRC) module 427 serving as detection modules mapped to MIMO algorithms configuring the mode switching unit 420 of the transmitter. That is, an MMSE scheme is used for SM and DSTTD algorithms, and an MRC scheme is used for a BF algorithm. Further, the mode switching unit 420 includes a first switch 441 for coupling an output signal of the A/D conversion unit 410 to an input terminal of the SM-MMSE module 423, the DSTTD-MMSE module 425, and the BF-MRC module 427, and a second switch 429 for selectively outputting an output signal of the SM-MMSE module 423, the DSTTD-MMSE module 425, and the BF-MRC module 427 to the decoding/demodulation unit 430.

The decoding/demodulation unit 430 performs a decoding and demodulation operation using a channel estimate from a channel estimator 440 and transmission mode information.

Figure 5:
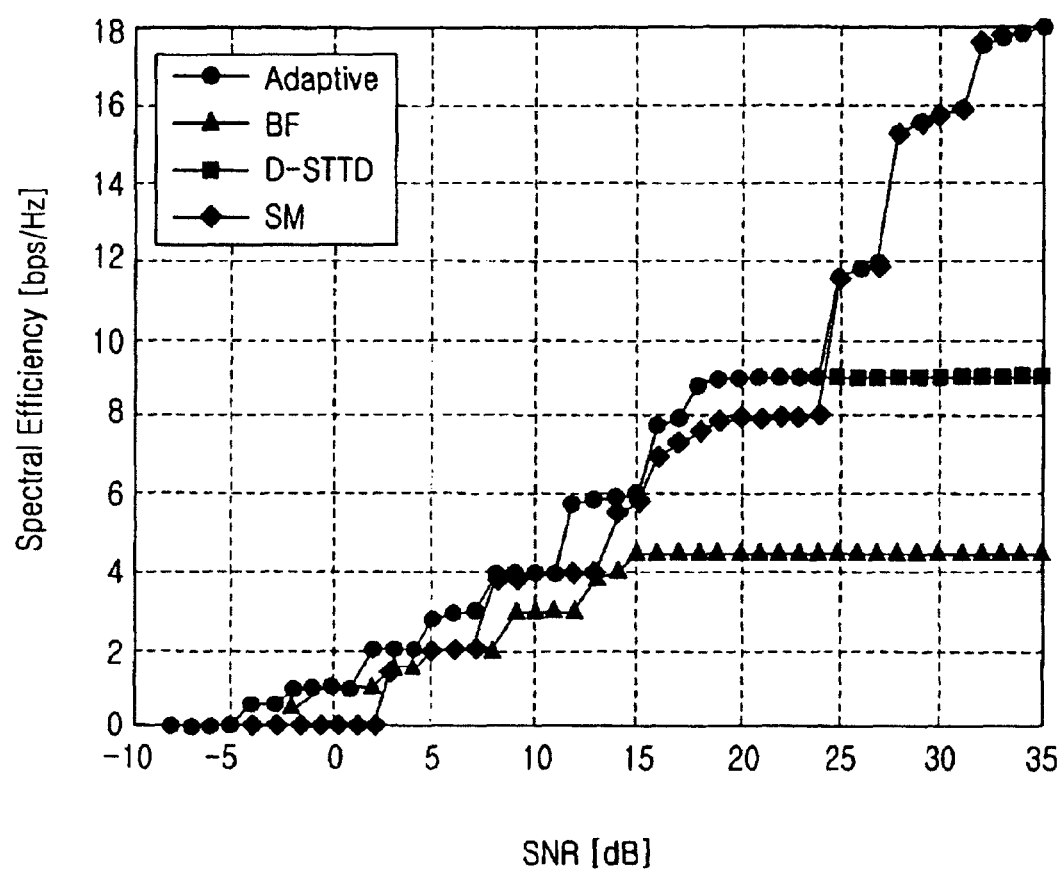
FIG. 5 is a graph illustrating performance simulation results for an adaptive transmission mode switching method in accordance with a preferred embodiment of the present invention and a conventional fixed MIMO transmission technique using an adaptive modulation and coding scheme (MCS).

FIG. 5 is a graph illustrating performance simulation results for an adaptive transmission mode switching method in accordance with a preferred embodiment of the present invention and a conventional fixed MIMO transmission scheme using an adaptive modulation and coding scheme (MCS). The simulation was performed for Channel Model 1 (rich scattering environment), but can be extended to other channel models.

Referring to FIG. 5, it is shown that the adaptive transmission mode switching method of the present invention produces gain in spectral efficiency of 13.5 bps/Hz for an SNR as compared with the BF scheme.

As described above, because an MIMO communication system using the adaptive transmission mode switching method of the present invention switches between MIMO transmission modes using spatial selectivity of the channel, it can obtain the maximum gain in an SNR and spectral efficiency.

Although preferred embodiments of the present invention have been disclosed for illustrative purposes, those skilled in the art will appreciate that various modifications, additions, and substitutions are possible, without departing from the scope of the present invention. Accordingly, the present invention is not limited to the above-described embodiments, but is defined by the following claims, along with their full scope of equivalents.

What is claimed is:

1. A multiple-input multiple-output (MIMO) wireless communication system, comprising:
    a transmitter having a plurality of transmit antennas for selecting one of at least two transmission schemes including a spatial multiplexing scheme and a spatial diversity scheme, processing a signal in the selected transmission scheme, and transmitting the signal through the plurality of transmit antennas; and
    at least one receiver having a plurality of receive antennas for processing a signal through the plurality of receive antennas in a reception scheme mapped to the selected transmission scheme of the transmitter,
    wherein the transmitter selects the one of the transmission schemes based on a relative condition number that is determined by a ratio between maximum and minimum eigenvalues of a spatial correlation matrix of a channel, and the at least one receiver feeds back a channel state information that includes the relative condition number.

2. The MIMO wireless communication system of claim 1, wherein the channel state information comprises an average signal to noise ratio (SNR).

3. The MIMO wireless communication system of claim 1, wherein the relative condition number is expressed by:

$$D_\lambda = \frac{\lambda_{max}}{\lambda_{min}},$$

where $\lambda_{max}$ and $\lambda_{min}$ denote maximum and minimum eigenvalues of a spatial correlation matrix of a MIMO channel, respectively.

4. The MIMO wireless communication system of claim 3, wherein $1 \leq D_\lambda \leq +\infty$.

5. The MIMO wireless communication system of claim 1, wherein the transmission schemes depend on channel quality regions.

6. The MIMO wireless communication system of claim 5, wherein the channel quality regions are defined by a combination of four channel models and SNR threshold values, the four channel models being defined by spatial selectivity that is a function of angle spread (AS), number of clusters, and Ricean K-factor.

7. The MIMO wireless communication system of claim 6, wherein the channel quality regions are predicted according to an average signal to noise ratio (SNR) and the relative condition number $D_\lambda$.

8. The MIMO wireless communication system of claim 7, wherein the relative condition number is expressed by:

$$D_\lambda = \frac{\lambda_{max}}{\lambda_{min}},$$

where $\lambda_{max}$ and $\lambda_{min}$ denote maximum and minimum eigenvalues of a spatial correlation matrix of a MIMO channel, respectively.

9. The MIMO wireless communication system of claim 8, wherein $1 \leq D_\lambda \leq +\infty$.

10. The MIMO wireless communication system of claim 6, wherein the four channel models comprise:
    a first model having characteristics of non-line-of-sight (N-LOS) and high AS;
    a second model having characteristics of NLOS and low AS;
    a third model having characteristics of quasi-line-of-sight (Q-LOS); and
    a fourth model having characteristics of full-line-of-sight (F-LOS).

11. The MIMO wireless communication system of claim 10, wherein the channel quality regions comprise four channel regions mapped to the channel models, the four channel regions being defined by $D_\lambda \in [1,5)$, $D_\lambda \in [5,30)$, $D_\lambda \in [30,90)$, and $D_\lambda \in [90,+\infty)$, respectively.

12. A transmitter for use in a multiple-input multiple-output (MIMO) wireless communication system having at least one receiver, the transmitter having a plurality of transmit antennas for selecting one of at least two transmission schemes including a spatial multiplexing scheme and a spatial diversity scheme, processing a signal in the selected transmission scheme, and transmitting the signal through the plurality of transmit antennas, and the at least one receiver having a plurality of receive antennas for processing a signal through the plurality of receive antennas in a reception scheme mapped to a transmission scheme of the transmitter, the transmitter further comprising:
    a controller for outputting a control signal for processing an input data signal;
    an encoding/modulation unit for encoding and modulating the data signal in response to the control signal;
    a mode switching unit for selecting one of the at least two transmission modes in response to the control signal, and processing and outputting transmission symbols in the selected transmission mode; and
    a digital to analog (D/A) conversion unit for converting the transmission symbols output from the mode switching unit according to D/A conversion and transmitting the converted symbols through the plurality of transmit antennas,
    wherein the transmitter selects the one of the transmission schemes based on a relative condition number that is determined by a ratio between maximum and minimum eigenvalues of a spatial correlation matrix of a channel, and the at least one receiver feeds back a channel state information that includes the relative condition number.

13. The transmitter of claim 12, wherein the mode switching unit comprises:
    MIMO modules operating in at least two different MIMO algorithms;
    a first switch for selectively connecting an output terminal of the encoding/modulation unit to an input terminal of the MIMO modules in response to a control signal; and
    a second switch for selectively connecting an output terminal of the MIMO modules to an input terminal of the D/A conversion unit.

14. The transmitter of claim 13, wherein the MIMO modules comprise:
    a spatial multiplexing (SM) module for processing the transmission symbols in an SM algorithm;

a double space time transmit diversity (DSTTD) module for processing the transmission symbols in a DSTTD module; and a beamforming (BF) module for processing the transmission symbols in a BF algorithm.

15. The transmitter of claim 14, wherein the control signal comprises a transmission mode indicator determined by the controller according to the channel state information received from the at least one receiver.

16. The transmitter of claim 15, wherein the channel state information comprises an average signal to noise ratio (SNR).

17. The transmitter of claim 12, wherein the relative condition number is expressed by:

$$D_\lambda = \frac{\lambda_{max}}{\lambda_{min}},$$

where $\lambda_{max}$ and $\lambda_{min}$ denote maximum and minimum eigenvalues of a spatial correlation matrix of a MIMO channel, respectively.

18. The transmitter of claim 17, wherein $1 \leq D_\lambda \leq +\infty$.

19. The transmitter of claim 18, wherein the transmission mode indicator comprises information about a MIMO scheme and an adaptive modulation and coding (AMC) scheme.

20. The transmitter of claim 19, wherein the controller comprises:

a look-up table for mapping the relative condition number $D_\lambda$ to the MIMO scheme and the AMC scheme.

21. A receiver for use in a multiple-input multiple-output (MIMO) wireless communication system having a transmitter, the transmitter having a plurality of transmit antennas for selecting one of at least two transmission schemes including a spatial multiplexing scheme and a spatial diversity scheme, processing a signal in the selected transmission scheme, and transmitting the signal through the plurality of transmit antennas, the receiver comprising:

a plurality of receive antennas for processing a signal through the plurality of receive antennas in a reception scheme mapped to a transmission scheme of the transmitter;

an analog to digital (A/D) conversion unit for converting the signal received through the plurality of receive antennas according to A/D conversion;

a channel estimator for estimating a channel using an output signal of the A/D conversion unit;

a reception mode switching unit for processing the output signal of the A/D conversion unit using an estimate of a channel estimated by the channel estimator in a reception mode mapped to the transmission scheme selected by the transmitter; and a decoding/demodulation unit for decoding and demodulating an output signal of the reception mode switching unit, based on the channel estimate and the transmission scheme, and outputting original data, wherein the transmitter selects the one of the transmission schemes based on a relative condition number that is determined by a ratio between maximum and minimum eigenvalues of a spatial correlation matrix of a channel, and the at least one receiver feeds back a channel state information that includes the relative condition number.

22. The receiver of claim 21, wherein the reception mode switching unit comprises:

a plurality of signal processing modules operating in signal processing algorithms mapped to MIMO modules of the transmitter;

a third switch for selectively connecting an output terminal of the A/D conversion unit to an input terminal of the plurality of signal processing modules in response to transmission mode information; and a fourth switch for selectively connecting an output terminal of the plurality of signal processing modules to the decoding/demodulation unit.

23. The receiver of claim 22, wherein each of the plurality of signal processing modules comprises:

at least one processing module using a minimum mean squared error (MMSE) scheme; and at least one processing module using a maximum ratio combining (MRC) scheme.

\* \* \* \* \*